US012731392B2

(12) United States Patent
Kolesnikov et al.

(10) Patent No.: US 12,731,392 B2
(45) Date of Patent: Sep. 8, 2026

(54) FINE-TUNING COMPUTER VISION NEURAL NETWORKS USING TASK REWARDS

(71) Applicant: Google LLC, Mountain View, CA (US)

(72) Inventors: Alexander Kolesnikov, Zurich (CH); Xiaohua Zhai, Zurich (CH); André Susano Pinto, Zurich (CH); Yuge Shi, London (GB); Lucas Klaus Beyer, Zurich (CH)

(73) Assignee: Google LLC, Mountain View, CA (US)

( * ) Notice: Subject to any disclaimer, the term of this patent is extended or adjusted under 35 U.S.C. 154(b) by 167 days.

(21) Appl. No.: 18/438,317

(22) Filed: Feb. 9, 2024

(65) Prior Publication Data

US 2024/0282093 A1 Aug. 22, 2024

Related U.S. Application Data

(60) Provisional application No. 63/444,534, filed on Feb. 9, 2023.

(51) Int. Cl.
*G06V 10/82* (2022.01)
*G06N 3/0455* (2023.01)

(52) U.S. Cl.
CPC .......... *G06V 10/82* (2022.01); *G06N 3/0455* (2023.01)

(58) Field of Classification Search
None
See application file for complete search history.

(56) References Cited

U.S. PATENT DOCUMENTS

2021/0334628 A1* 10/2021 Carbune ................ G10L 15/20
2022/0208355 A1* 6/2022 Li ........................... G06N 3/09

OTHER PUBLICATIONS

Rennie, S.—"Self-critical Sequence Training for Image Captioning"—arXiv Nov. 16, 2017, pp. 1-16 (Year: 2017).*
Bengio et al., "Scheduled sampling for sequence prediction with recurrent neural networks," Paper, Presented at the 29th Conference on Neural Information Processing Systems, Montreal Canada, Dec. 7-12, 2015; Advances in Neural Information Processing Systems, Dec. 2015, 28:1-9.
Carion et al., "End-to-end object detection with transformers," Paper, Presented at Proceedings of the European Conference: Computer Vision, Glasgow, UK, Aug. 23-28, 2020; LNIP, Nov. 2020, 12346:1-17.
Chen et al., "Pix2seq: A language modeling framework for object detection," Paper, Presented at Proceedings of the International Conference on Learning Representations, Virtual Event, Apr. 25-29, 2022, pp. 1-17.
Devlin et al., "BERT: Pre-training of deep bidirectional transformers for language understanding," CoRR, Submitted on Oct. 11, 2018, arXiv:1810.04805v1, 14 pages.
Dosovitskiy et al., "An image is worth 16×16 words: Transformers for image recognition at scale," Paper, Presented at Proceedings of the International Conference on Learning Representations, Virtual Event, May 3-7, 2021, pp. 1-21.

(Continued)

*Primary Examiner* — Bernard Krasnic
(74) *Attorney, Agent, or Firm* — Fish & Richardson P.C.

(57) ABSTRACT

Methods, systems, and apparatus, including computer programs encoded on computer storage media, for fine-tuning a computer vision neural network. In particular, the neural network is fine-tuned using task rewards and through reinforcement learning.

21 Claims, 4 Drawing Sheets

(56) References Cited

OTHER PUBLICATIONS

Extended European Search Report in European Appln. No. 24156954.0, mailed on Jul. 4, 2024, 8 pages.
Glaese et al. "Improving alignment of dialogue agents via targeted human judgements," CoRR, Submitted on Sep. 28, 2022, arXiv:2209.14375v1, pp. 1-77.
Henderson et al., "End-to-End Training of Object Class Detectors for Mean Average Precision," Paper, Presented at Proceedings of the Asian Conference on Computer Vision, Taipei, Taiwan, Nov. 20-24, 2016; LNIP, 2017, 10115:198-213.
Holtzman et al., "The curious case of neural text degeneration," Paper, Presented at Proceedings of the International Conference on Learning Representations, Virtual Conference, Apr. 27-30, 2020, pp. 1-16.
Hu et al., "ExpansionNet v2: Block Static Expansion in fast end to end training for Image Captioning," CoRR, Submitted on Aug. 19, 2022, arXiv:2208.06551v3, pp. 1-11.
Huang et al., "MetricOpt: Learning to Optimize Black-Box Evaluation Metrics," Paper, Presented at Proceedings of the IEEE/CVF Conference: Computer Vision and Pattern Recognition, Nashville, TN, Jun. 20-25, 2021, pp. 174-183.
Karpathy et al., "Deep visual-semantic alignments for generating image descriptions," Paper, Presented at Proceedings of the IEEE/CVF Conference: Computer Vision and Pattern Recognition, Boston, MA, Jun. 7-12, 2015; IEEE Transactions on Pattern Analysis and Machine Intelligence, Apr. 2017, 39(4):664-676.
Keneshloo et al., "Deep reinforcement learning for sequence-to-sequence models," IEEE transactions on neural networks and learning systems, Jul. 2020, 31(7):2469-2489.
Kirillov et al., "Panoptic segmentation," Paper, Presented at Proceedings of the IEEE/CVF Conference: Computer Vision and Pattern Recognition, Long Beach, CA, Jun. 15-20, 2019, pp. 9404-9413.
Kolesnikov et al., "Closed-form training of conditional random fields for large scale image segmentation," Paper, Presented at Proceedings of the European Conference: Computer Vision, Zurich, Switzerland, Sep. 6-12, 2014; CoRR, Submitted on Mar. 27, 2014, arXiv:1403.7057v1, pp. 1-14.
Kolesnikov et al., "UViM: A Unified Modeling Approach for Vision with Learned Guiding Codes," CoRR, Submitted on Oct. 14, 2022, arXiv:2205.10337v3, pp. 1-22.
Kolesnikov et al., "UViM: A unified modeling approach for vision with learned guiding codes," Paper, Presented at the 36th Conference on Neural Information Processing Systems, New Orleans, LA, Nov. 28-Dec. 9, 2022; Advances in Neural Information Processing Systems, Dec. 2022, 35:1-14.
Krahenbuhl et al., "Efficient Inference in Fully Connected CRFs with Gaussian Edge Potentials," Paper, Presented at the 25th Conference on Neural Information Processing Systems, Granada, Spain, Dec. 12-14, 2011; Advances in Neural Information Processing Systems, Dec. 2011, 24:1-9.
Kreutzer et al., "Can neural machine translation be improved with user feedback?," Paper, Presented at Proceedings of the ACL conference: North American Chapter of the Association for Computational Linguistics: Human Language Technologies, New Orleans, LA, Jun. 1-6, 2018, pp. 92-105.
Lafferty et al., "Conditional random fields: Probabilistic models for segmenting and labeling sequence data," Paper, Presented at Proceedings of the International Conference on Machine Learning, Williamstown, MA, Jun. 28-Jul. 1, 2001, 65 pages.
Le et al., "Deep reinforcement learning in computer vision: a comprehensive survey," Artificial Intelligence Review, Apr. 2022, 55(4):2733-2819.
Leblond et al., "Machine translation decoding beyond beam search," Paper, Presented at Proceedings of the ACL Conference: Empirical Methods in Natural Language Processing, Virtual Event, Nov. 7-11, 2021, pp. 8410-8434.
Lin et al., "Focal loss for dense object detection," Paper, Presented at Proceedings of the IEEE Conference: International Conference on Computer Vision, Venice, Italy, Oct. 22-29, 2017, pp. 2980-2988.
Lin et al., "Microsoft COCO: Common Objects in Context," Paper, Presented at Proceedings of the European conference on computer vision, Zurich, Switzerland, Sep. 6-12, 2014; LNIP, 2014, 8693:740-755.
Mathe et al., "Reinforcement learning for visual object detection," Paper, Presented at Proceedings of the IEEE/CVF Conference: Computer Vision and Pattern Recognition, Las Vegas, NV, Jun. 27-30, 2016, pp. 2894-2902.
Nowozin et al., "Decision tree fields," Paper, Presented at Proceedings of the IEEE conference: International Conference on Computer Vision, Barcelona, Spain, Nov. 6-13, 2011, pp. 1-8.
Ouyang et al., "Training language models to follow instructions with human feedback," Paper, Presented at the 36th Conference on Neural Information Processing Systems, New Orleans, LA, Nov. 28-Dec. 9, 2022; Advances in Neural Information Processing Systems, Dec. 2022, 35:1-15.
Ramesh et al., "Zero-Shot Text-to-Image Generation," Paper, Presented at the International Conference on Machine Learning, Virtual Conference, Jul. 18-24, 2021; PMLR, Apr. 2021, 139:11 pages.
Ranzato et al., "Sequence Level Training with Recurrent Neural Networks," CoRR, Submitted on Dec. 15, 2015, arXiv:1511.06732v3, pp. 1-15.
Ren et al., "Faster R-CNN: Towards Real-Time Object Detection with Region Proposal Networks," Paper, Presented at the 29th Conference on Neural Information Processing Systems, Montreal Canada, Dec. 7-12, 2015; Advances in Neural Information Processing Systems, Dec. 2015, 28:1-9.
Rennie et al., "Self-critical Sequence Training for Image Captioning," CoRR, Submitted on Dec. 2, 2016, arXiv:1612.00563v1, 16 pages.
Rennie et al., "Self-critical sequence training for image captioning," Paper, Presented at Proceedings of the IEEE/CVF Conference: Computer Vision and Pattern Recognition, Honolulu, HI, Jul. 21-26, 2017, pp. 7008-7024.
Schmidt, "Generalization in Generation: A closer look at Exposure Bias," Paper, Presented at Proceedings of the 3rd Workshop on Neural Generation and Translation, Hong Kong, China, Nov. 4, 2019, pp. 157-167.
Shao et al., "Objects365: A large-scale, high-quality dataset for object detection," Paper, Presented at Proceedings of the IEEE/CVF Conference: International Conference on Computer Vision, Seoul, South Korea, Oct. 27, 2019-Nov. 2, 2019, pp. 8430-8439.
Shazeer et al., "Adafactor: Adaptive learning rates with sublinear memory cost," Paper, Presented at Proceedings of the International Conference on Machine Learning, Stockholm, Sweden, Jul. 10-15, 2018; PMLR, 2018, 80:4596-4604.
Shen et al., "Minimum Risk Training for Neural Machine Translation," CoRR, Submitted on Dec. 9, 2015, arXiv:1512.02433v2, pp. 1-9.
Song et al., "Training deep neural networks via direct loss minimization," Poster, Presented at Proceedings of the International Conference on Machine Learning, New York, NY, Jun. 19-24, 2016; PMLR, 2016, 48:2169-2177.
Stahlberg et al., "On NMT search errors and model errors: Cat got your tongue?," Paper, Presented at Proceedings of the ACL Conference: Conference on Empirical Methods in Natural Language Processing and the International Joint Conference on Natural Language Processing, Hong Kong, China, Nov. 3-7, 2019, pp. 3356-3362.
Steiner et al., "How to train your ViT? Data, Augmentation, and Regularization in Vision Transformers," CoRR, Submitted on Jun. 18, 2021, arXiv:2106.10270v1, pp. 1-14.
Stiennon et al., "Learning to summarize with human feedback," Paper, Presented at Proceedings of the IEEE/CVF Conference: Computer Vision and Pattern Recognition, Seattle, WA, Jun. 13-19, 2020, pp. 1-14.
Vaswani et al., "Attention is all you need," Paper, Presented at the 31st Conference on Neural Information Processing Systems, Long Beach, CA, Dec. 4-9, 2017; Advances in Neural Information Processing Systems, Dec. 2017, 30:1-11.

(56) References Cited

OTHER PUBLICATIONS

Vedantam et al., "CIDEr: Consensus-based Image Description Evaluation," Paper, Presented at Proceedings of the IEEE/CVF Conference: Computer Vision and Pattern Recognition, Boston, MA, Jun. 7-12, 2015, pp. 4566-4575.
Wang et al., "End-to-End Transformer Based Model for Image Captioning," CoRR, Submitted on Mar. 29, 2022, arXiv:2203.15350v1, 10 pages.
Williams, "Simple statistical gradient-following algorithms for connectionist reinforcement learning, " Machine learning, May 1992, 8(3):229-256.
Zhai et al., "Scaling vision transformers," Paper, Presented at Proceedings of the IEEE/CVF Conference: Computer Vision and Pattern Recognition, New Orleans, LA, Jun. 18-24, 2022, pp. 12104-12113.

* cited by examiner

400

| MODEL | mAP (%) | AR@100 (%) |
|---|---|---|
| *Ours* ($\text{REWARD}_{\text{MAP}}$) | 39.2 → 54.3 | 54.4 → 67.2 |
| *Ours* ($\text{REWARD}_{\text{RECALL}}$) | N/A | 54.4 → 68.4 |
| CHEN ET AL. (2022) | 47.1 | N/A |

FIG. 4

FINE-TUNING COMPUTER VISION NEURAL NETWORKS USING TASK REWARDS

CROSS-REFERENCE TO RELATED APPLICATION

This application claims priority to U.S. Provisional Application No. 63/444,534, filed on Feb. 9, 2023. The disclosure of the prior application is considered part of and is incorporated by reference in the disclosure of this application.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a computer vision neural network to perform a computer vision task. In particular, the system fine-tunes a pre-trained computer vision neural network on task rewards in order to improve the performance of the computer vision neural network on the task.

Particular embodiments of the subject matter described in this specification can be implemented so as to realize one or more of the following advantages.

This specification describes techniques for improving the performance of a computer vision neural network on a computer vision task. In particular, the system improves the performance of the computer vision neural network by fine-tuning the neural network on task rewards, e.g., through reinforcement learning. Thus, by first using maximum likelihood pre-training and then fine-tuning to optimize task rewards, the system ensures that the computer vision neural network is tailored to the task risk for the computer vision task, i.e., that the neural network will perform well in its intended usage at inference and not just on the pre-training data set.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows an example of the performance of the described techniques.

Like reference numbers and designations in the various drawings indicate like elements.

DETAILED DESCRIPTION

Figure 1:
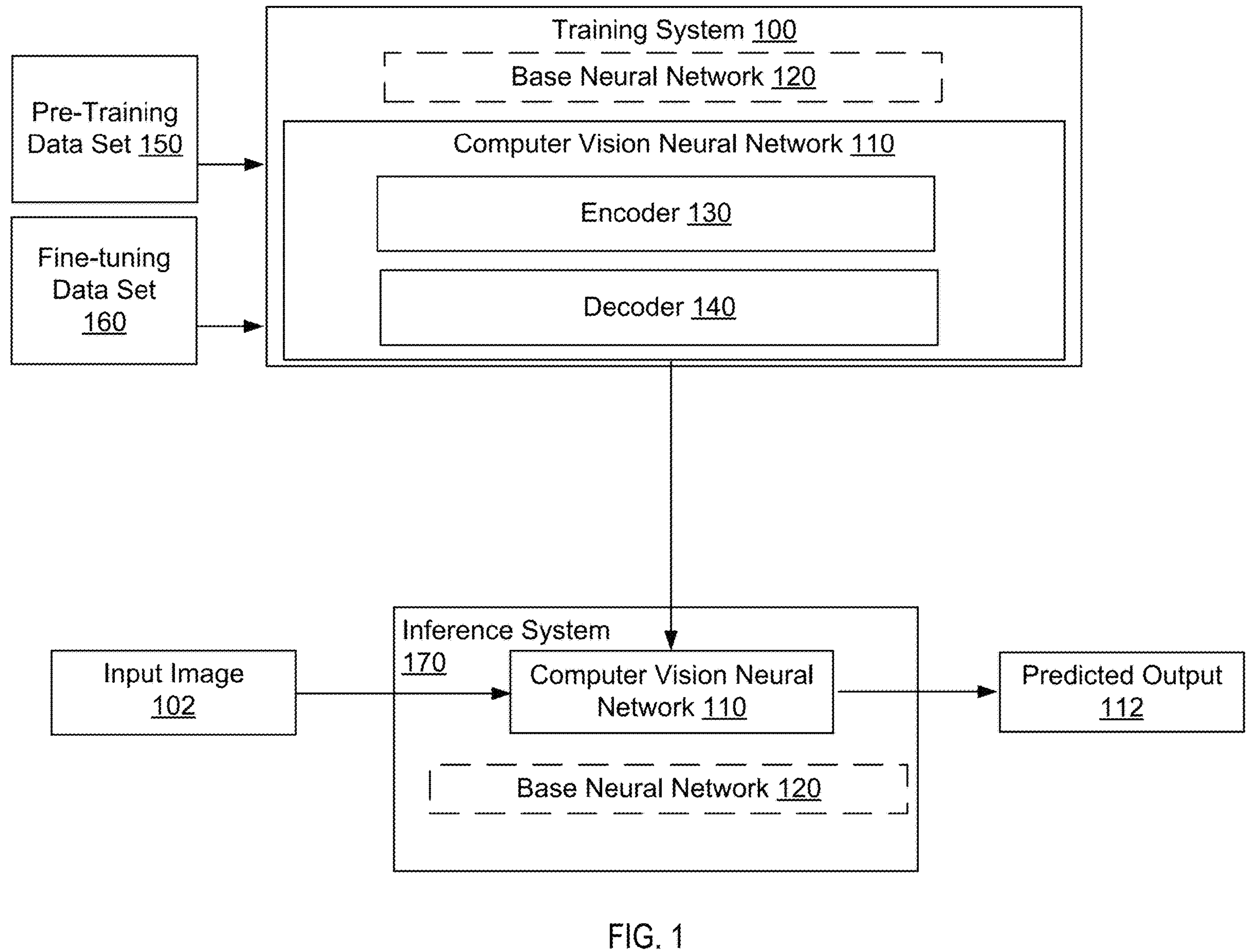
FIG. 1 is a diagram of an example training system.

FIG. 1 is a diagram of an example training system 100. The training system 100 is an example of a system implemented as computer programs on one or more computers in one or more locations, in which the systems, components, and techniques described below can be implemented.

This system 100 trains a computer vision neural network 110 that is used to perform a computer vision task.

The computer vision task can be any appropriate computer vision task that requires processing an input image 102, i.e., processing the intensity values of the pixels of the input image, to generate a predicted output 112 for the input image 102.

As a particular example, the computer vision task can be a task that requires producing high-dimensional structured outputs that assign one or more predicted values ("labels") to each of a plurality of pixels in the input image 102, e.g., to each pixel in the input image.

For example, the task can be one of: instance segmentation, where the output assigns a respective instance label to each pixel in the image that identifies which object instance, if any, the pixel depicts; semantic segmentation, where the output assigns a respective class label to each pixel in the input image that identifies the object class to which the pixel belongs; panoptic segmentation, where the output identifies a class label and an instance label for each pixel; monocular depth estimation, where the output identifies a respective depth value for each pixel in the input image; surface normal estimation, where the output identifies a respective surface orientation for each pixel; image colorization, where the input is a greyscale image and the output is a colorized image, e.g., an RGB image or other image that includes multiple color channels for each pixel of the image; object detection, where the output identifies positions and, optionally, object classes of one or more objects in the image; or image super-resolution, where the output is an image that has a higher resolution than the input image.

After training, the system 100 or another inference system 170 can use the neural network 110 (and, in some cases, a base computer vision neural network 120 as described in more detail below) to generate predicted outputs 112 for the computer vision task for new input images 102.

As a particular example, the inference system 170 can be part of a perception system embedded within an agent, e.g., a robot or an autonomous vehicle, that processes images and optionally other sensor data collected by sensors of the agent and the predicted output can be used by the perception system or other software on-board the agent to control the agent as the agent navigates through the environment.

As another particular example, the inference system 170 can be part of a perception system embedded within or in communication with a different type of device that processes sensor data, e.g., a camera monitoring system, a mobile phone, and so on. The outputs generated by the inference system can be used as part of a pre-processing stage before images are displayed to a user or can be used to automatically trigger other actions.

As yet another particular example, client devices can interact with the inference system through an application programming inference (API), e.g., a web-based API. In particular, client devices can submit an API call that includes or identifies an image to be analyzed and the inference system can provide, in response, data identifying the predicted output. For example, the inference system can format the predicted output in a specified format, e.g., as a JavaScript Object Notation (JSON) file or as a file in another type of data-interchange format, and provide the file in response to the API call.

In particular, the computer vision neural network 110 is a neural network having parameters and that is configured to process an input image 102 in accordance with the parameters to generate a network output that specifies an output sequence that includes a plurality of tokens from a vocabulary and that represents a predicted output 112 for the input image 102 for the computer vision task.

As a particular example, the computer vision neural network 110 can include an encoder neural network 130 and a decoder neural network 140.

The encoder neural network 130 can be configured to process the input image 102 to generate an encoded representation of the input image 102, i.e., a sequence of a plurality of encoded vectors that collectively represents the input.

The encoder neural network 130 can be any appropriate image encoder neural network that receives the intensity values of the pixels of the image and encodes them into hidden representations. Examples of such encoders include convolutional neural networks, Transformer neural network, or neural networks that include both convolutional layers and self-attention layers.

The decoder neural network 140 is configured to process the encoded representation of the input image to generate the output sequence.

In particular, the decoder 140 can be an auto-regressive decoder neural network that, at each time step, processes the tokens at any earlier time steps in the output sequence while conditioned on the encoded representation of the input image to generate a respective score distribution for the time step, e.g., a probability distribution, over the vocabulary of tokens. The decoder neural network 140 can then sample from the score distribution to select the token in the output sequence at the time step. The combination of the score distributions for the plurality of time steps can be considered as the "network output" for a given input image. As a particular example, the decoder 140 can be a Transformer decoder that applies causal self-attention over the already generated tokens and cross-attention into the encoded representation. As another particular example, the decoder 140 can be a Transformer decoder that process an input sequence that includes the encoded representation (and any already generated tokens in the output sequence), i.e., that does not include any cross-attention operations but does include causal self-attention.

Generally, because the decoder neural network 140 is auto-regressive, the system 100 can use the same neural network to generate multiple different network outputs, and therefore, output sequences in response to the same encoded representation, e.g., by using beam search decoding from score distributions generated by the neural network, using a Sample-and-Rank decoding strategy, by using different random seeds for the pseudo-random number generator that is used in sampling for different runs through the neural network or using another sampling strategy that leverages the auto-regressive nature of the neural network 140.

That is, because the sampling introduces stochasticity into the generation process, processing the same encoded representation multiple different times using the decoder 140 can result in different network outputs and different output sequences being generated.

In some cases, the system 100 generates the predicted output 112 for the computer vision task by parsing the output sequence according to a predetermined syntax.

In some other cases, the system 100 generates the predicted output 112 for the computer vision task by processing the output sequence using a base computer vision neural network 120 to generate the predicted output 112.

To train the computer vision neural network 110, the system 100 obtains a pre-training data set 150 that includes a plurality of pre-training training examples.

Each pre-training example includes (i) a pre-training image and (ii) a target output sequence representing a target output for the pre-training image for the computer vision task.

The system 100 also obtains a fine-tuning data set 160 that includes a plurality of fine-tuning images.

In some cases, the fine-tuning data set 160 and the pre-training data set overlap 150, i.e., at least some of the fine-tuning images are the same as at least some of the pre-training images.

For example, the plurality of fine-tuning images in the fine-tuning data set can be the same as the pre-training images in the plurality of training examples in the pre-training data set, so that the system 100 trains the neural network 110 on the same set of images twice, with two different objectives.

In some other cases, there is no overlap between the two data sets 150 and 160 and none of the fine-tuning images are in the pre-training data set 150.

The system 100 then trains the computer vision neural network on the pre-training data set 150.

After training the computer vision neural network 100 on the pre-training data set 150, the system 100 trains the computer vision neural network 110 on the fine-tuning data set 160. This training on the fine-tuning data set 160 is also referred to as "fine-tuning" the computer vision neural network 110.

As part of this fine-tuning, the system 100 makes use of task reward values for predicted outputs 112 for the computer vision task that are generated by the computer vision neural network 110.

Generally, the task reward values measure a task-specific quality of the first predicted output. That is, the task reward values will generally be measured differently for different computer vision tasks.

Examples of task rewards for various tasks are provided below with reference to FIG. 2.

Training the computer vision neural network 110 is described below with reference to FIGS. 2 and 3.

Figure 2:
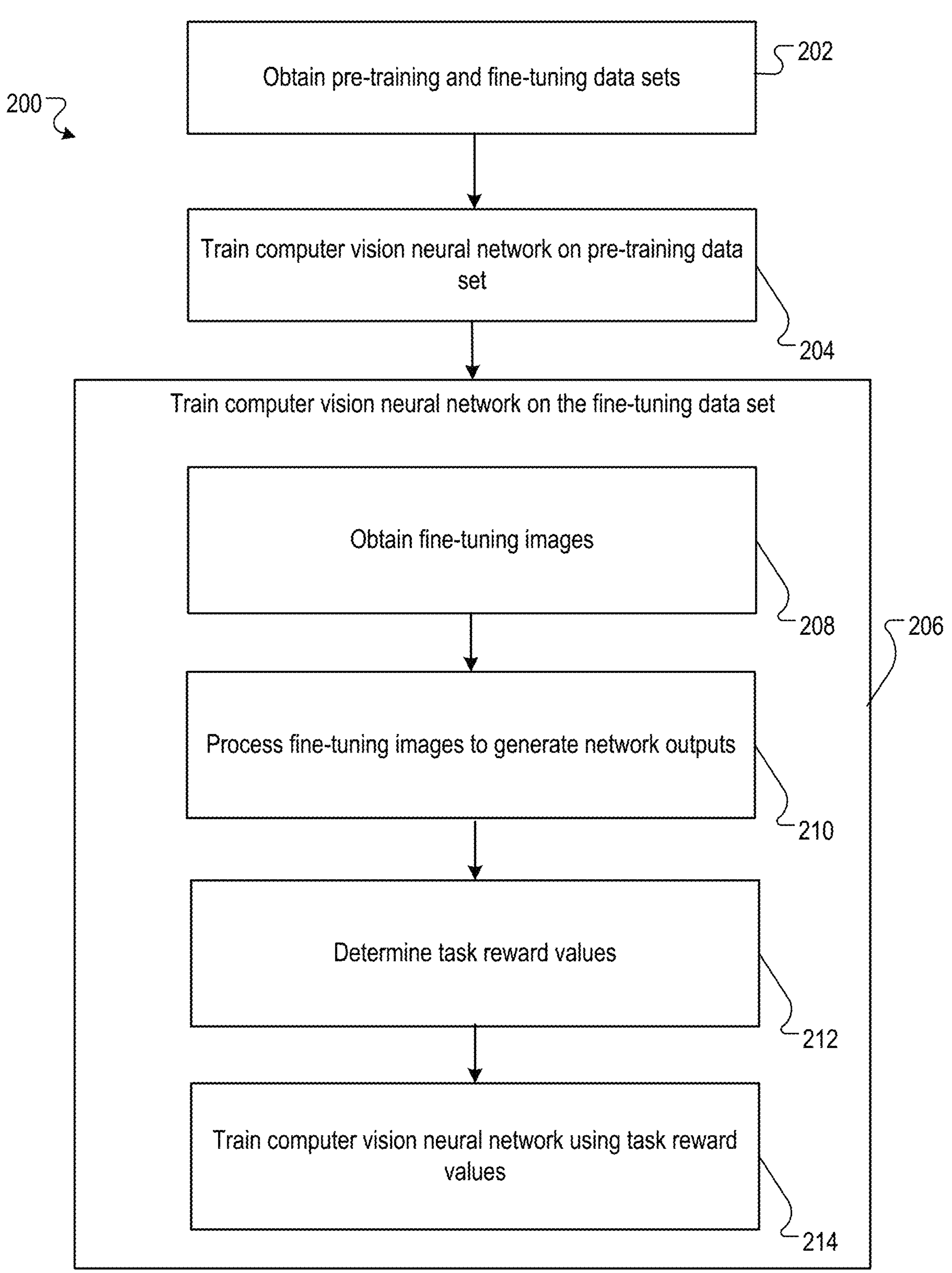
FIG. 2 is a flow diagram of an example process for training the computer vision neural network.

FIG. 2 is a flow diagram of an example process 200 for training a computer vision neural network. For convenience, the process 200 will be described as being performed by a system of one or more computers located in one or more locations. For example, a training system, e.g., the training system 100 depicted in FIG. 1, appropriately programmed in accordance with this specification, can perform the process 200.

The system obtains a pre-training data set and a fine-tuning data set (step 202). As described above, the pre-training data set includes a plurality of pre-training images and the fine-tuning data set includes a plurality of fine-tuning images.

The system then trains the computer vision neural network on the pre-training data set to optimize a maximum likelihood objective (step 204). The maximum likelihood objective is an objective that measures, for each pre-training example, a likelihood assigned to the target output sequence in the pre-training example by a network output generated by the computer vision neural network by processing the pre-training image in the pre-training example.

To determine the likelihood assigned to a target output sequence, the system can process the training image in the training example using the encoder neural network to generate an encoded representation of the training image.

The system can then determine a respective probability for each token in the target sequence by processing, using the decoder neural network, the tokens at any earlier time steps in the target output sequence while conditioned on the encoded representation of the input image to generate a respective score distribution for the time step, e.g., a probability distribution, over the vocabulary of tokens.

The system can the assign, as the probability for the token, the probability for the token in the probability distribution. The system can then compute the likelihood from the token probabilities, e.g., as a logarithm of the probability assigned to the target output sequence, where the probability assigned to the target output sequence is the product of the token probabilities.

Thus, the objective can satisfy, for a given training image x and target output sequence y:

$$-\log p(y|x,\theta)$$

where θ are the network parameters of the computer vision neural network.

Because the entire target output sequence is available in advance and does not need to be sampled, the system can generate the token probabilities for all of the tokens in the target sequence in a single forward pass through the decoder.

For example, to perform this pre-training, the system can at, each of a plurality of pre-training steps, obtain a set of one or more pre-training training examples from the pre-training data set.

The system can then, for each of the pre-training training examples, process the pre-training image in the pre-training training example using the computer vision neural network to generate a third network output and determine a likelihood assigned to the target output sequence in the pre-training example by the third network output generated by the computer vision neural network by processing the pre-training image in the pre-training example, e.g., as described above.

The system can then determine a gradient with respect to parameters of the computer vision neural network of the maximum likelihood objective, where the maximum likelihood objective measures an average of the likelihoods for the pre-training examples in the set of one or more pre-training examples.

The system can then update the parameters using the gradient, e.g., by applying an appropriate optimize to the gradient, e.g., the Adam optimizer, the AdamW optimizer, the Adafactor optimizer, and so on.

Thus, during the pre-training, the system trains the computer vision neural network using maximum likelihood and without making use of task rewards.

Thus, in this first step, the system performs model training via conditional maximum likelihood estimation. The resulting model can capture very complex data distributions. However, these type of models, i.e., trained using conditional MLE, have a crucial shortcoming: while they can excel at capturing the distribution of training and test data, they are agnostic of the actual task risk and may not perform sufficiently well in their intended usage. Thus, the system makes use of fine-tuning to address this issue.

In particular, after training the computer vision neural network on the pre-training data set to optimize the maximum likelihood objective, the system trains the computer vision neural network on the fine-tuning data set (step 206).

As part of this "fine-tuning," the system can repeatedly perform iterations of steps 208-214 to "fine-tune" (i.e., further train) the neural network starting from the pre-trained values of the parameters of the neural network generated by the training the neural network on the pre-training data set. An iteration of steps 208-214 is also referred as a "fine-tuning training step."

The system obtains a set of one or more fine-tuning images from the fine-tuning data set, e.g., by sampling a mini-batch of images from the fine-tuning data set (step 208).

For each of the fine-tuning images, the system processes the fine-tuning image using the computer vision neural network to generate a first network output that specifies a first output sequence that represents a first predicted output for the computer vision task (step 210).

The system determines a first task reward value for the first predicted output for the computer vision task (step 212).

The first task reward value measures a task-specific quality of the first predicted output. That is, the task reward values will generally be measured differently for different computer vision tasks.

The system then trains the computer vision neural network using the first task rewards on a reinforcement learning objective that maximizes expected task rewards received for network outputs generated by the computer vision neural network (step 214).

In particular, the system does not backpropagate through the task reward values when training on this objective and therefore can use any appropriate task reward, including (i) task rewards that are non-differentiable metrics, that are non-decomposable metrics, or metrics that are both non-differentiable and non-decomposable or (ii) task rewards that are received from human users, e.g., that are generated by displaying the predicted outputs to human users and receiving user inputs specifying the task reward values.

For example, the fine-tuning data set can include a respective target output for the computer vision task for each of the plurality of fine-tuning images and the first task reward value can measure a quality of the first predicted output relative to the respective target output for the computer vision task for the fine-tuning image.

As another example, the system can display the predicted outputs to human users and receive, in response, user inputs specifying the task reward values.

Generally, the system can process the first output sequence to generate the first predicted output and then determine the first task reward value based on the first predicted output.

As an example of this, the tokens in the first output sequence can be arranged according to a particular syntax. In this example, the system can parse the first output sequence according to the particular syntax to generate the first predicted output.

For example, the computer vision task can be object detection and the system can generate, from the tokens in the first output sequence, data identifying one or more bounding boxes in the input image and, for each bounding box, a respective object category from the set of object categories to which an object depicted in the bounding box belongs.

In this example, the first output sequence can include a respective subsequence corresponding to each of the one or more bounding boxes and the system can, for each bounding box, identify, from tokens in the corresponding subsequence that belong to a first set of tokens (from the vocabulary) that represent possible coordinates in the input image, coordinates of the bounding box in the input image; and identify, as the respective object category to which the object depicted in the bounding box belongs, the object category represented by a set of one or more tokens belonging to a second set of tokens (from the vocabulary) that represent object categories.

As a simplified example, if each token in the vocabulary is an integer and pixel are represented by the integers 0 through 255, and there are 1000 categories, then the first set of tokens can include the integers 0 through 255 and the second set of tokens can include the integers 266-1265.

As a particular example of this, the respective subsequence corresponding to a given bounding box can include four tokens from the first set of tokens and the four discrete numbers that are represented by the four tokens can specify coordinates in the input image of two corners of the bounding box.

As another particular example of this, the respective subsequence corresponding to a given bounding box can include four tokens from the first set of tokens and the four discrete numbers that are represented by the four tokens can specify coordinates in the input image of a center of the bounding box and a height and width of the bounding box.

In some of these examples, generating the data identifying the one or more bounding boxes can include, for each bounding box, identifying, as a confidence score for the bounding box, a confidence score represented by a set of one or more tokens belonging to a third set of tokens (from the vocabulary) that represent confidence scores.

For object detection, the task reward can measure any of a variety of aspects of the object detection output.

For example, the task reward value can measure a recall of the first predicted output relative to a target object detection output for the image.

As another example, the task reward value can measure an approximate mean average precision (mAP) of the first predicted output relative to the target object detection output.

As another example, the computer vision task can be a keypoint prediction task and the output sequence can include a respective subsequence of quantized image coordinate values for each of one or more keypoints that specify a position of the keypoint in the input image. Optionally, the respective subsequence for each keypoint can include a set of tokens from a second set of tokens, e.g., natural language tokens, that represent a description of the keypoint.

For keypoint prediction, the task reward can measure any of a variety of aspects of the object detection output. For example, the task reward value can measure a mean squared error between the ground truth positions for the keypoints and the predicted positions in the predicted output.

In some cases, to generate the first predicted output from the first output sequence, the system can process the output sequence using a base computer vision neural network to generate the first predicted output.

The base computer vision neural network is a neural network that is configured to receive as input a sequence of tokens and to process the sequence of tokens to generate a predicted output for the computer vision task. The base computer vision neural network can be a feedforward neural network, e.g., one that generates the entire predicted output in a single forward pass given the first output sequence. For example, the base computer vision neural network can be a Vision Transformer.

For example, making use of the base computer neural network can be advantageous when the predicted output for the computer vision task is a structured output that includes one or more predicted values for each of a plurality of pixels in the input image, e.g., for all of the pixels in the input image, resulting in a very high-dimensional output.

In these cases, the output sequence can include over one hundred times fewer values than the predicted output for the computer vision task.

Thus, the system splits up the task into two parts, the first part requiring generating the output sequence and the second part requiring generating the structured output from the output sequence. This can allow the system to more effectively perform the task, i.e., by decomposing a difficult, high-dimensional structured prediction task into two simpler components.

The base computer vision neural network can generally have been trained on any appropriate objective that encourages the neural network to accurately map output sequences to predicted outputs.

As a particular example, the base computer vision neural network can be a neural network that has been trained jointly with a restricted oracle neural network on training data that includes a plurality of training images and, for each training image, a ground truth output for the computer vision task. In this example, the restricted oracle neural network is configured to process a ground truth output for the computer vision task to generate a training guiding code sequence for the corresponding training image, and, during the joint training and for each training image in the first training data, the base computer vision neural network receives as input a training guiding code sequence for the training image generated by the restricted oracle neural network. Thus, during training, the base computer vision neural network has access to "privileged" or "restricted" information that is generated using the ground truth output.

As one example, the computer vision task can be an image segmentation task. For example this task can be (i) instance segmentation and the predicted output identifies a respective object instance corresponding to each pixel of the plurality of pixels in the input image, (ii) semantic segmentation and the predicted output identifies a respective object class corresponding to each pixel of the plurality of pixels in the input image, or (iii) panoptic segmentation and the predicted output identifies a respective object instance and a respective object class corresponding to each pixel of the plurality of pixels in the input image.

In these examples, the task reward value can measure a segmentation quality of the predicted output. For example, the task reward value can be a per-example reward that is derived from the Panoptic Quality (PQ) metric.

As a particular example, the reward can satisfy:

$$\text{reward}(y, k) = \left[\sum\nolimits_{(p,g)\in TP_k} IoU(p, g)\right] - w|FP_k|$$

where y is the ground truth output and k is the predicted output and $TP_k$ is the set of matched instances between the predicted and ground truth outputs, FPk is the set of extra predicted instances in the predicted output relative to the ground truth output, w is a fixed positive constant between zero and one, and IoU is the intersection over union metric.

As another example, the computer vision task can be a colorization task, i.e., where the input image is a grayscale image, and wherein the predicted output is a colorized image.

In this example, the task reward value can be an output that (i) penalizes gray colors in the predicted output, (ii) promotes color diversity in the predicted output, or (iii) both.

As a particular example, the reward can be a product of two terms that are derived from the input image converted to the Lab colorspace. In this colorspace, the L channel encodes "lightness", while the a and b channels encode color. The first term of the reward discourages gray colors. It is defined as the fraction of image pixels that have sufficiently "vivid color", where vivid color is defined as $a^2+b^2>10$. The second term of the reward promotes color diversity. It is defined as the image-level entropy of the hue value, with hue being computed by arctan(b/a). In some case, to compute the entropy, the system discretizes the hue into 7 discrete values, distributing the bins uniformly within the range where hue values are defined.

As described above, once the first reward value is computed, the system then trains the computer vision neural network using the first task rewards on a reinforcement learning objective that maximizes expected task rewards received for network outputs generated by the computer vision neural network.

For example, the system can compute a gradient with respect to parameters of the computer vision neural network of an objective that is based on a product of (i) a reward value that is derived from the first task reward value for the first predicted output and (ii) a likelihood assigned to the first output sequence by the first network output, e.g., by back-propagating through the likelihoods.

In some implementations, the reward value that is derived from the first task reward value for the first predicted output is equal to the first task reward value.

In some other implementations, the reward value that is derived from the first task reward value for the first predicted output is a difference between the task reward value for the first predicted output and a baseline reward value for the fine-tuning image. In particular, the system can incorporate a baseline reward value to reduce the variance of the gradient estimate performed at every fine-tuning step.

In these implementations, the system generates the baseline reward value by processing the fine-tuning image using the computer vision neural network to generate a second network output that specifies a second output sequence that represents a second predicted output for the computer vision task and determining, as the baseline reward value for the fine-tuning image, a "second" task reward value for the second predicted output for the computer vision task. That is, the system samples another output sequence from the computer vision neural network given the same input. As described above, because of the auto-regressive nature of the computer vision neural network, this can result in a different output sequence being generated.

In some other implementations, the system generates the baseline reward value by processing the fine-tuning image using the computer vision neural network to generate multiple different second network outputs that each specify a second output sequence that represents a second predicted output for the computer vision task and determining, as the baseline reward value for the fine-tuning image, a "second" task reward value by averaging the respective task reward values for the second predicted outputs.

In yet other implementations, the system can track the average task reward value computed across multiple different network outputs, e.g., the network outputs in the current set of network output or across multiple training iterations, and then use the tracked average task reward value as the baseline reward value.

The system can then update the parameters using the gradient, e.g., by applying an appropriate optimize to the gradient, e.g., the Adam optimizer, the AdamW optimizer, the Adafactor optimizer, and so on.

Thus, by first using maximum likelihood pre-training and then fine-tuning to optimize task rewards, the system ensures that the computer vision neural network is tailored to the task risk for the computer vision task and performs well in its intended usage at inference.

Figure 3:
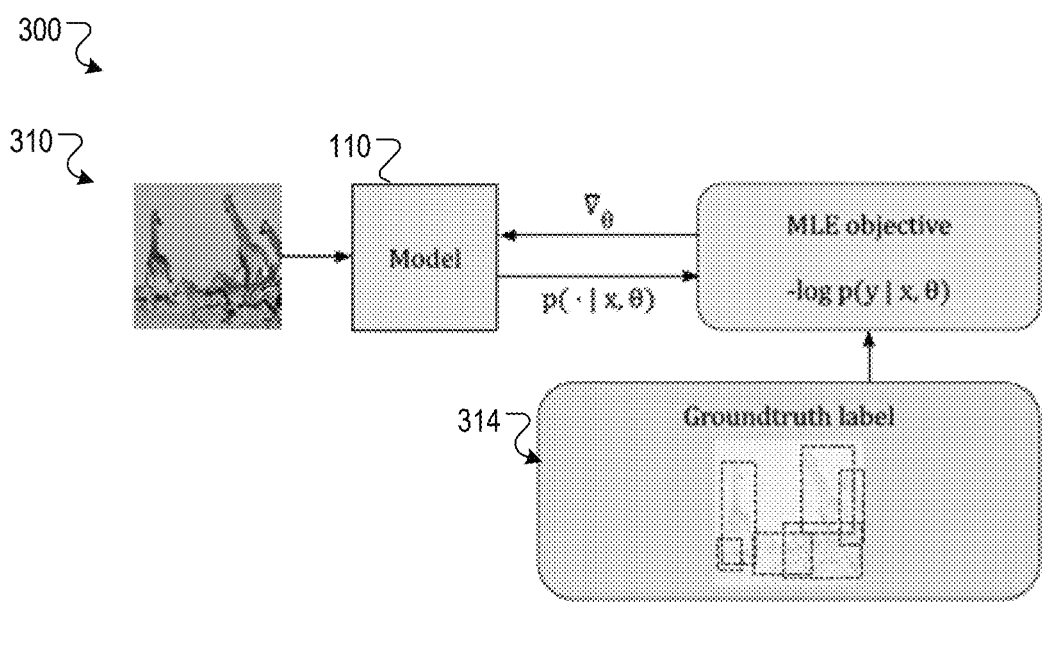
FIG. 3 is a diagram of the training of the computer vision neural network.
Figure 3:
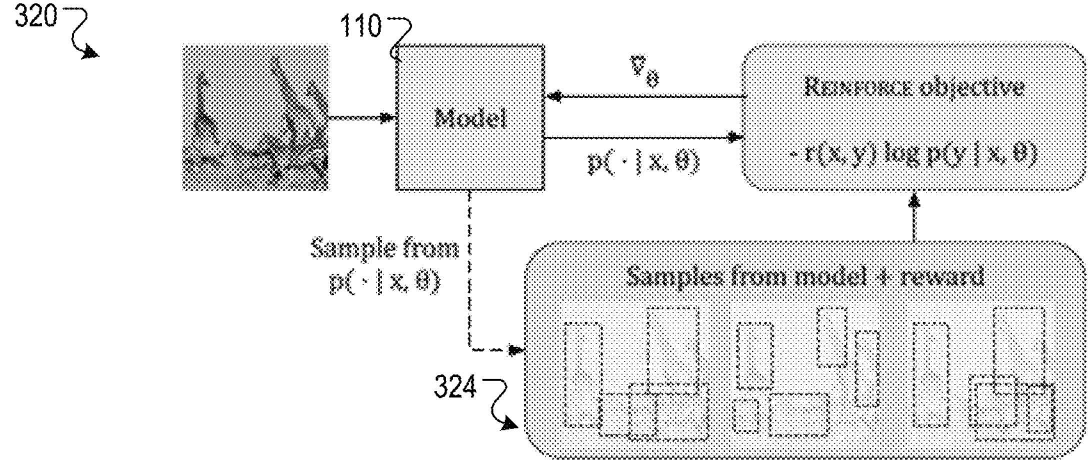

FIG. 3 is a diagram 300 that shows an example of the training of the computer vision neural network 110 for an object detection task.

In particular, the diagram 300 shows the pre-training 310 and the fine-tuning 320 of the neural network 110.

As can be seen from the diagram 300, during the pre-training 310, the system 100 uses a groundtruth label 314 for a pre-training image x 312 to determine a gradient of the MLE objective, where $p(\cdot|x, \theta)$ represents the "network output" assigned to the target output sequence generated from the groundtruth label 314 by the neural network 110 in accordance with current values of the network parameters $\theta$. The system 100 then uses the gradient to update the network parameters $\theta$. As can be seen from FIG. 3, the groundtruth label 314 includes bounding boxes for multiple objects in the input image.

During fine-tuning 320 on the other hand, the system 100 uses task rewards 324 for samples (predicted outputs) from the neural network 110 generated by processing the fine-training image x 332 to determine a gradient of the reinforcement learning objective (which, in the example of FIG. 3, is REINFORCE), where r(x, y) is the reward value that is derived from the task reward value for the predicted outputs generated by the neural network 110.

FIG. 4 shows an example 400 of the performance of the described techniques.

In particular, FIG. 4 shows an example of the performance of a neural network trained using the described techniques on an object detection task in terms of both mean average precision (mAP) and AR (average recall) @100.

In particular, FIG. 4 shows two variants of the described techniques ("ours"), one of which uses mAP as the task reward and another that uses recall as the task reward. As can be seen from FIG. 4, the fine-tuning significantly improves the performance of the neural network and, for mAP, causes the neural network to achieve a performance that exceeds a baseline technique (described in Chen, T., Saxena, S., Li, L., Fleet, D. J., and Hinton, G. Pix2seq: A language modeling framework for object detection. In ICLR, 2022) even though the pre-trained version did not exceed the baseline and even though the baseline uses larger image resolutions.

Similar results can be shown for other tasks, e.g., panoptic segmentation, colorization, and so on. For example, for panoptic segmentation, fine-tuning causes the described techniques operating on 512×512 images to outperform a baseline technique (UViM) that also uses the base computer vision neural network but operates on images with 1280×1280 resolution.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for training a computer vision neural network that is configured to process an input image to generate a network output that specifies an output sequence that comprises a plurality of tokens from a vocabulary and that represents a predicted output for the input image for a computer vision task, the method comprising:

obtaining a pre-training data set that comprises a plurality of pre-training training examples, each pre-training example comprising (i) a pre-training image and (ii) a target output sequence representing a target output for the pre-training image for the computer vision task;

obtaining a fine-tuning data set that includes a plurality of fine-tuning images;

training the computer vision neural network on the pre-training data set to optimize a maximum likelihood objective that measures, for each pre-training example, a likelihood assigned to the target output sequence in the pre-training example by a network output generated by the computer vision neural network by processing the pre-training image in the pre-training example, comprising, at each of a plurality of pre-training training steps:

obtaining a set of one or more pre-training training examples from the pre-training data set;

for each of the pre-training training examples:

processing the pre-training image in the pre-training training example using the computer vision neural network to generate a third network output; and determining a likelihood assigned to the target output sequence in the pre-training example by the third network output generated by the computer vision neural network by processing the pre-training image in the pre-training example; and determining a gradient with respect to parameters of the computer vision neural network of the maximum likelihood objective, wherein the maximum likelihood objective measures an average of the likelihoods for the pre-training examples in the set of one or more pre-training examples; and after training the computer vision neural network on the pre-training data set to optimize the maximum likelihood objective:

training the computer vision neural network on the fine-tuning data set, the training comprising, at each of a plurality of fine-tuning training steps:

obtaining a set of one or more fine-tuning images from the fine-tuning data set;

for each of the fine-tuning images:

processing the fine-tuning image using the computer vision neural network to generate a first network output that specifies a first output sequence that represents a first predicted output for the computer vision task; and determining a first task reward value for the first predicted output for the computer vision task, wherein the first task reward value measures a task-specific quality of the first predicted output; and training the computer vision neural network using the first task rewards on a reinforcement learning objective that maximizes expected task rewards received for network outputs generated by the computer vision neural network.

2. The method of claim 1, wherein training the computer vision neural network using the first task rewards on a reinforcement learning objective that maximizes expected task rewards received for network outputs generated by the computer vision neural network comprises, for each fine-tuning image in the set:

computing a gradient with respect to parameters of the computer vision neural network of an objective that is based on a product of (i) a reward value that is derived from the first task reward value for the first predicted output and (ii) a likelihood assigned to the first output sequence by the first network output; and updating the parameters using the gradient.

3. The method of claim 2, wherein, for each fine-tuning image in the set, the reward value that is derived from the first task reward value for the first predicted output is a difference between the task reward value for the first predicted output and a baseline reward value for the fine-tuning image.

4. The method of claim 3, wherein the training further comprises, at each of the plurality of fine-tuning training steps:

for each of the fine-tuning images:

processing the fine-tuning image using the computer vision neural network to generate a second network output that specifies a second output sequence that represents a second predicted output for the computer vision task; and determining, as the baseline reward value for the fine-tuning image, a task reward value for the second predicted output for the computer vision task.

5. The method claim 2, wherein the likelihood assigned to the first output sequence by the first network output is a logarithm of a probability assigned to the first output sequence by the first network output.

6. The method of claim 1, wherein the plurality of fine-tuning images in the fine-tuning data set are the same as the pre-training images in the plurality of training examples in the pre-training data set.

7. The method of claim 1, wherein, for each of the pre-training training examples, the likelihood is a logarithm of a probability assigned to the target output sequence in the pre-training example by the third network output generated by the computer vision neural network by processing the pre-training image in the pre-training example.

8. The method of claim 1, wherein the computer vision neural network comprises:

an encoder neural network configured to process the input image to generate an encoded representation of the input image, and an auto-regressive decoder neural network configured to auto-regressively generate the network output conditioned on the encoded representation of the input image.

9. The method of claim 8, wherein the auto-regressive decoder neural network is configured to, at each of a plurality of time steps:

process an input sequence comprising any tokens at any earlier time steps in the output sequence to generate a probability distribution over the tokens in the vocabulary, and wherein the network output comprises the probability distributions at the plurality of time steps.

10. The method of claim 8, wherein the auto-regressive decoder neural network is an auto-regressive self-attention decoder neural network.

11. The method of claim 8, wherein the encoder neural network is a Vision Transformer, a convolutional neural network, or a neural network that includes both convolutional neural network layers and self-attention layers.

12. The method of claim 1, wherein the fine-tuning data set comprises a respective target output for the computer vision task for each of the plurality of fine-tuning images, and wherein the first task reward value measures a quality of the first predicted output relative to the respective target output for the computer vision task for the fine-tuning image.

13. The method of claim 1, wherein determining a first task reward value for the first predicted output for the computer vision task comprises:

processing the first output sequence to generate the first predicted output; and determining the first task reward value based on the first predicted output.

14. The method of claim 13, wherein the tokens in the first output sequence are arranged according to a particular syntax, and wherein processing the first output sequence to generate the first predicted output comprises parsing the first output sequence according to the particular syntax to generate the first predicted output.

15. The method of claim 13, wherein processing the first output sequence to generate the first predicted output comprises:

processing the first output sequence using a base computer vision neural network to generate the first predicted output, wherein the base computer vision neural network is configured to receive as input a sequence of tokens and to process the sequence of tokens to generate a predicted output for the computer vision task.

16. The method of claim 15, wherein the base computer vision neural network is a feedforward neural network.

17. The method of claim 16, wherein the base computer vision neural network is a Vision Transformer.

18. The method of claim 1, wherein the predicted output for the computer vision task is a structured output that includes one or more predicted values for each of a plurality of pixels in the input image.

19. A system comprising:

one or more computers; and one or more storage devices storing instructions that, when executed by the one or more computers, cause the one or more computers to perform operations for training a computer vision neural network that is configured to process an input image to generate a network output that specifies an output sequence that comprises a plurality of tokens from a vocabulary and that represents a predicted output for the input image for a computer vision task, the operations comprising:

obtaining a pre-training data set that comprises a plurality of pre-training training examples, each pre-training example comprising (i) a pre-training image and (ii) a target output sequence representing a target output for the pre-training image for the computer vision task;

obtaining a fine-tuning data set that includes a plurality of fine-tuning images;

training the computer vision neural network on the pre-training data set to optimize a maximum likelihood objective that measures, for each pre-training example, a likelihood assigned to the target output sequence in the pre-training example by a network output generated by the computer vision neural network by processing the pre-training image in the pre-training example, comprising, at each of a plurality of pre-training training steps:

obtaining a set of one or more pre-training training examples from the pre-training data set;

for each of the pre-training training examples:

processing the pre-training image in the pre-training training example using the computer vision neural network to generate a third network output; and determining a likelihood assigned to the target output sequence in the pre-training example by the third network output generated by the computer vision neural network by processing the pre-training image in the pre-training example; and determining a gradient with respect to parameters of the computer vision neural network of the maximum likelihood objective, wherein the maximum likelihood objective measures an average of the likelihoods for the pre-training examples in the set of one or more pre-training examples; and after training the computer vision neural network on the pre-training data set to optimize the maximum likelihood objective:

training the computer vision neural network on the fine-tuning data set, the training comprising, at each of a plurality of fine-tuning training steps:

obtaining a set of one or more fine-tuning images from the fine-tuning data set;

for each of the fine-tuning images:

processing the fine-tuning image using the computer vision neural network to generate a first network output that specifies a first output sequence that represents a first predicted output for the computer vision task; and determining a first task reward value for the first predicted output for the computer vision task, wherein the first task reward value measures a task-specific quality of the first predicted output; and training the computer vision neural network using the first task rewards on a reinforcement learning objective that maximizes expected task rewards received for network outputs generated by the computer vision neural network.

20. The system of claim 19, wherein training the computer vision neural network using the first task rewards on a reinforcement learning objective that maximizes expected task rewards received for network outputs generated by the computer vision neural network comprises, for each fine-tuning image in the set:

computing a gradient with respect to parameters of the computer vision neural network of an objective that is based on a product of (i) a reward value that is derived from the first task reward value for the first predicted output and (ii) a likelihood assigned to the first output sequence by the first network output; and updating the parameters using the gradient.

21. One or more non-transitory computer storage media storing instructions that, when executed by one or more computers, cause the one or more computers to perform operations for training a computer vision neural network that is configured to process an input image to generate a network output that specifies an output sequence that comprises a plurality of tokens from a vocabulary and that represents a predicted output for the input image for a computer vision task, the operations comprising:

obtaining a pre-training data set that comprises a plurality of pre-training training examples, each pre-training example comprising (i) a pre-training image and (ii) a target output sequence representing a target output for the pre-training image for the computer vision task;

obtaining a fine-tuning data set that includes a plurality of fine-tuning images;

training the computer vision neural network on the pre-training data set to optimize a maximum likelihood objective that measures, for each pre-training example, a likelihood assigned to the target output sequence in the pre-training example by a network output generated by the computer vision neural network by processing the pre-training image in the pre-training example, comprising, at each of a plurality of pre-training training steps:

obtaining a set of one or more pre-training training examples from the pre-training data set;

for each of the pre-training training examples:

processing the pre-training image in the pre-training training example using the computer vision neural network to generate a third network output; and determining a likelihood assigned to the target output sequence in the pre-training example by the third network output generated by the computer vision neural network by processing the pre-training image in the pre-training example; and determining a gradient with respect to parameters of the computer vision neural network of the maximum likelihood objective, wherein the maximum likelihood objective measures an average of the likelihoods for the pre-training examples in the set of one or more pre-training examples; and after training the computer vision neural network on the pre-training data set to optimize the maximum likelihood objective:

training the computer vision neural network on the fine-tuning data set, the training comprising, at each of a plurality of fine-tuning training steps:

obtaining a set of one or more fine-tuning images from the fine-tuning data set;

for each of the fine-tuning images:

processing the fine-tuning image using the computer vision neural network to generate a first network output that specifies a first output sequence that represents a first predicted output for the computer vision task; and determining a first task reward value for the first predicted output for the computer vision task, wherein the first task reward value measures a task-specific quality of the first predicted output; and training the computer vision neural network using the first task rewards on a reinforcement learning objective that maximizes expected task rewards received for network outputs generated by the computer vision neural network.

* * * * *